June 23, 1942.  F. B. HALFORD  2,287,735
COOLING OF PISTONS OF INTERNAL COMBUSTION ENGINES
Filed Oct. 30, 1941  2 Sheets-Sheet 1
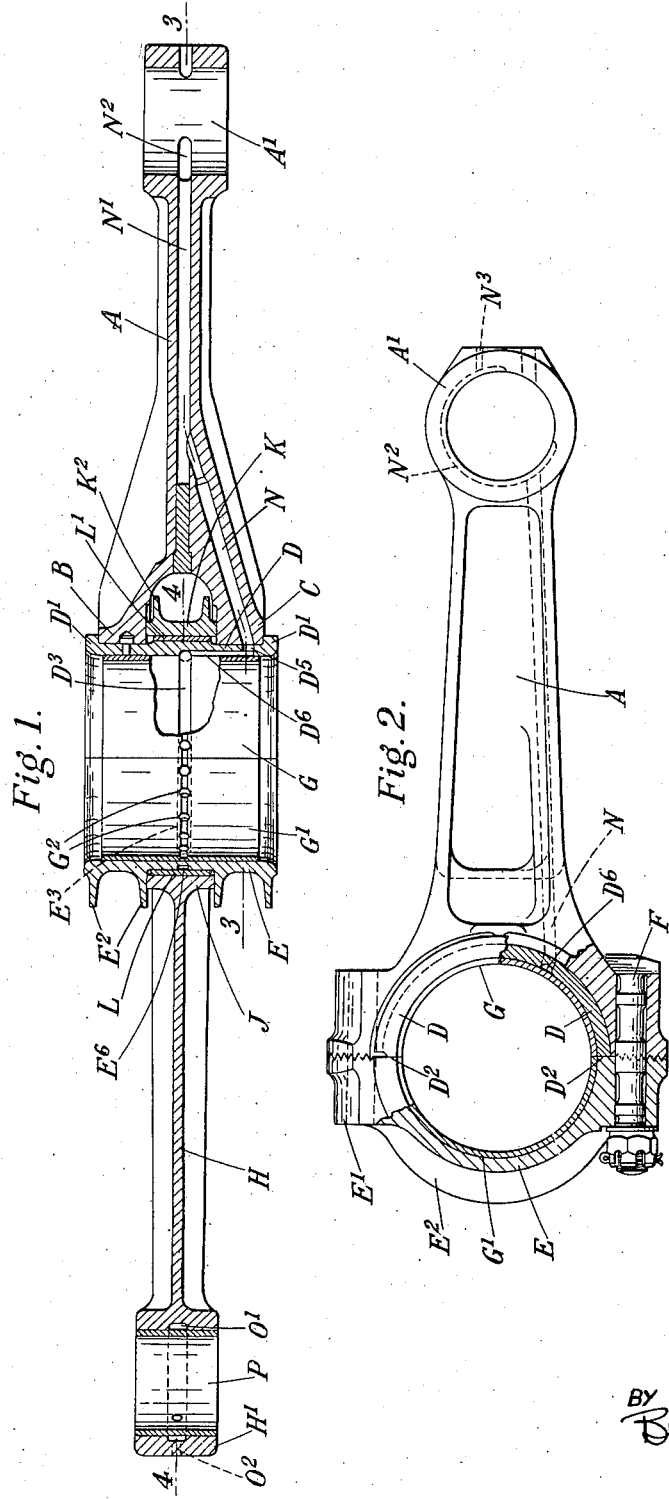
INVENTOR
F.B. HALFORD
BY
ATTORNEYS Patented June 23, 1942

2,287,735

UNITED STATES PATENT OFFICE 2,287,735

COOLING OF PISTONS OF INTERNAL COMBUSTION ENGINES

Frank Bernard Halford, Edgware, England, assignor to D. Napier & Son Limited, London, England, a company of Great Britain Application October 30, 1941, Serial No. 417,199
In Great Britain November 8, 1940

3 Claims. (Cl. 123—176)

This invention relates to the cooling of pistons of internal combustion engines and the delivery of a liquid into the piston for this purpose. The invention has for its object to ensure the necessary flow of this cooling liquid.

In the case where the cooling of the piston is effected by oil delivered by way of passages in the crankshaft, the crank pin and the connecting rod, it has been demonstrated that the inertia effect on the oil in the passage through the rod causes the oil merely to oscillate in that passage so that no adequate cooling of the piston takes place.

According to the method embodied in this invention the flow of the piston-cooling liquid is positively interrupted at the crank pin when the latter is in certain angular positions in which the inertia forces acting on the liquid in the passage through the connecting rod tends to prevent its flow to the piston, the flow being permitted only during a determined and appreciable angular period. The interruption to the flow is effected between the crank pin and the big end of the connecting rod over that part of each revolution of the crank pin during which the inertia forces act on the liquid in the passage in the connecting rod in a direction adverse to the desired flow. In the construction employed to carry out this method there is combined with at least one radial passage leading from the interior of a hollow crank pin to an opening in the surface of the pin, at least one passage running throughout the connecting rod from an opening within the big-end, and a shell and a bearing-metal lining, or like member or members, in the big-end with ports or passages and grooves therein which register both with the end of the radial passage through the crank pin and the end of the passage in the connecting rod over an angular period during which the crank pin is in those angular positions in which inertia forces acting on the liquid in the passage through the connecting rod do not tend to prevent its flow through that rod to the piston.

The shell or other member or members in the big-end in which are the ports and passages which control the flow of cooling liquid are so disposed in the big-end that the crank pin will rotate therein and thus open or close the liquid passages. The ports and passages in and through the member or members in the big-end are arranged so that communication will be established and maintained between the interior of the crank pin and the passage through the connecting rod during movement of the crank pin through a determined arc while the crank pin is on the side nearest to the cylinder of a plane normal to the cylinder axis and containing the crankshaft axis. The length of this arc may be for example of the order of 120°, so that flow through the passages can take place while the crank pin is moving between points situated approximately at 60° on either side of the inner dead centre of the piston. During the remaining approximately 240° of crank pin movement in one revolution of the crankshaft the flow of cooling liquid to the piston will be stopped by the relative positions then occupied by the ported parts in the big-end.

The accompanying drawings illustrate by way of example how the invention may be carried out in practice in the case of a big-end construction in an engine wherein the pistons in two cylinders act through their connecting rods on one and the same crank pin. In these drawings:

Figure 1 is a section through the connecting rods of the two cylinders when these rods are in line, the section being in a plane containing the axis of the crank pin and running longitudinally through the centres of the two connecting rods.

Figure 2 is a side elevation of the one connecting rod whose big end is forked, a part of one fork being shown in section as in a plane normal to the crank pin axis and the plane lying about the centre of the width of one of the big end fork arms.

The construction and arrangement illustrated is such as may be used in an engine with opposed cylinders, that is to say with the cylinder axes 180° apart about the crankshaft axis. The construction shown comprises the following features:

The big end connecting rod A is forked transversely, that is to say, in the direction of the crank pin axis. The crank pin itself is not shown in Figures 1 and 2. The two fork arms B and C carry between them a shell D which extends in one piece between these arms, the ends of the shell being formed with circumferential flanges or ribs $D^1$ which prevent displacement of the shell in the axial direction. A cap E extends in one piece between the fork arms B and C to both of which the cap is connected by bolts F which pass through lugs E$^1$ with which the cap is provided and lugs such as C$^1$ formed on the fork arms B and C. This cap E thus acts as a rigid connection between the fork arms of the connecting rod A. The cap E is formed externally with ribs E$^2$ which run circumferentially and are spaced apart in the transverse direction. The lugs or enlargements E$^1$ of the cap butt up against the corresponding parts of the shell, as can be seen at D$^2$ in Figure 2, when the cap is bolted up in place. Bearing metal G, G$^1$ preferably in strip form, serves as a lining for the shell D and cap E The second connecting rod H has its big end J provided with enlargements or lugs J$^1$ and has a cap K with lugs K$^1$ for bolts which are passed also through the lugs J$^1$. The cap is conveniently formed with external flanges or ribs K$^2$ which run circumferentially. There is a lining of bearing metal L L$^1$ preferably in strip form within the big end J and cap K. This big end lies on the centre part in the width of the cap E of the connecting rod A and its cap K lies between the fork arms B and C of that connecting rod, the big end J being located laterally between two of the flanges E$^2$ on the cap E.

Figure 3:
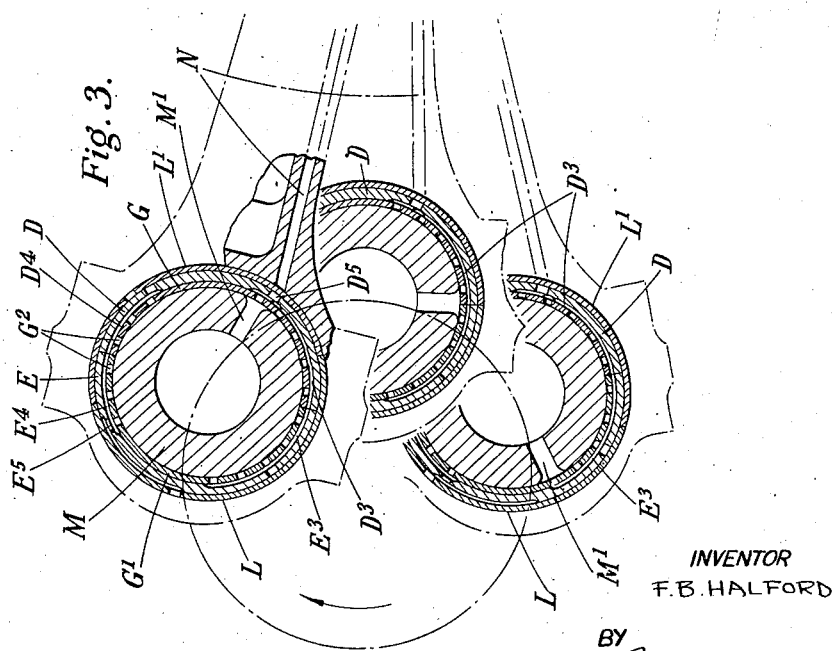
Figure 3 is a sectional elevation normal to the crank pin axis and on the line 3—3 in Figure 1 showing the crank pin and the big end of the forked connecting rod in three different angular positions about the crank shaft axis.

Referring now to Figure 3, it will be seen that the crank pin M which is hollow has a radial hole M$^1$ through which lubricant which serves to cool the piston can flow under pressure. In the bearing metal lining G G$^1$ is a series of holes G$^2$ spaced apart circumferentially and positioned in the transverse direction where they can register successively with the end of the radial passage M$^1$ through the crank pin. Over a certain determined arc in the inner face of the shell D extends a circumferential groove D$^3$ and in the inner face of the cap E is a similar groove E$^3$ and these grooves D$^3$ and E$^3$ coincide where they are in the parts of the shell D and cap E which abut at D$^2$, and the grooves are positioned where they will register with the holes G$^2$ in the bearing metal lining. A hole D$^5$ runs radially from a laterally extending branch D$^6$ of the groove D$^3$ as seen in Figure 1. The hole D$^5$ is thus in the part of the shell which lies within the fork arm C of the big end. Through this fork arm and the connecting rod A runs a passage N N$^1$ the part N of this passage ending in the face of the fork arm in an orifice with which the hole D$^5$ registers, while at its other end the passage N$^1$ opens into a groove N$^2$ in the inner face of the little end A$^1$. This groove N$^2$ extends for some distance around inside the little end as can be seen in Figure 2. From it leads a hole N$^3$ directed towards the piston. The oil which is caused to flow through the passage N N$^1$ through the connecting rod A passes by way of the groove N$^2$ around inside the little end over the outer face of the liner of bearing metal, which is not shown, to the hole N$^3$ through which the oil is squirted on to the under side of the piston. Thus oil can flow from within the crank pin M through the radial hole M$^1$ and the holes G$^2$ in the bearing metal lining, thence by way of the one circumferential groove D$^3$ and the lateral branch D$^6$ in the shell through the radial hole D$^5$ into the passage N N$^1$ and by way of the little end to the piston. It will be apparent that this flow can only occur during rotation of the crank while the hole M$^1$ in the crank pin passes in succession over those holes G$^2$ which communicate with the groove D$^3$ and the corresponding end groove E$^3$ from which the oil can flow by way of the hole D$^5$ into the passage N. This flow will be prevented during the remaining arc through which the crank pin rotates.

In Figure 3 the crank pin M is shown in three different angular positions as the crankshaft rotates in the direction indicated by the arrow. In the uppermost of the three views the orifice at the outer end of the passage M$^1$ through the crank pin has just come into a position wherein oil can begin to flow through out of the holes G$^2$ into the end part of the groove D$^3$ and thence by way of the hole D$^5$ into the passage N in the connecting rod. In the second or intermediate position shown this flow can continue, the end of the radial hole M$^1$ through the crank pin lying opposite to the junction between the groove D$^3$ in the shell and the groove E$^3$ in the cap. In the third and lowermost position the flow is about to be cut off as the end of the hole M$^1$ comes opposite to the holes G$^2$ which open into the end of the groove E$^3$. This interruption in the flow will be maintained throughout the remaining arc of the crankshaft rotation until the crank pin is again in the angular position in which it is shown in the uppermost view in Figure 3.

Figure 4:
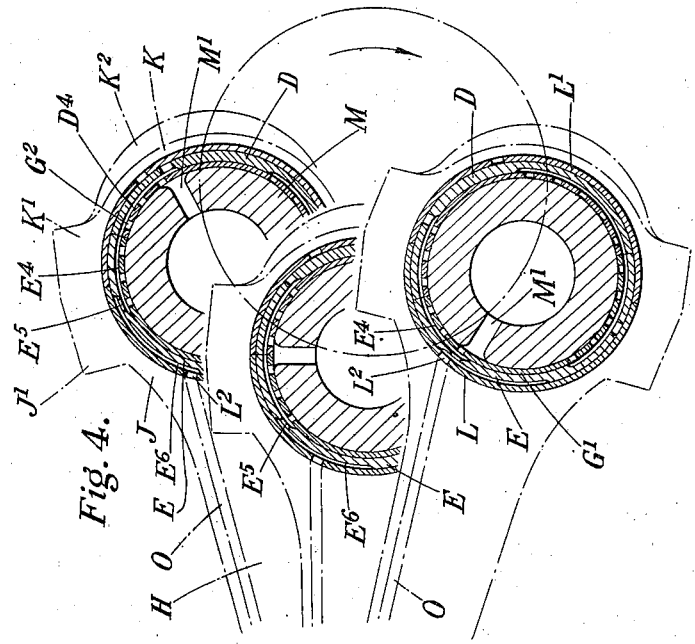
Figure 4 is a view similar to Figure 3, but on the line 4—4 in Figure 1 and showing in three different angular positions the big end of the second connecting rod.

Turning now to the arrangement for the flow to the piston of the connecting rod H, this is shown in Figure 4 wherein the crank pin M is indicated in three different angular positions as the crankshaft rotates in the direction of the arrow. In the part G$^1$ of the inner bearing metal lining there are spaced holes G$^2$ as already described and these open into a circumferentially running groove E$^4$ formed in the inner surface of the cap E. Continuous with this groove E$^4$ is a similar groove D$^4$ in the inner surface of the shell D. A hole E$^5$ through the cap E leads from the inner groove E$^4$ into a similar groove E$^6$ formed in the outer surface of the cap. This groove E$^6$ extends over an arc which may differ both in length and in circumferential position, or both, from the groove E$^4$ in the inner surface. It will be appreciated that these grooves are quite separate from and are in angular positions different from the grooves D$^3$ and E$^3$. Through the lining M of the second or outer big end J is a hole L$^2$ which registers internally with the groove E$^6$ in the outer surface of the cap E and externally with the end of a hole O which runs throughout the length of the connecting rod H.

In a manner similar to what is shown in Figure 3 so in Figure 4 is the crank pin M shown in three successive angular positions which it occupies as the crank shaft rotates. In the lowermost of these views the outer end of the radial hole M$^1$ through the crank pin is just coming into a position wherein oil can flow from within the crank pin through the holes G$^2$ into the groove E$^4$ in the cap E. Thence this oil can flow by way of the hole E$^5$ and groove E$^6$ in the outside of the cap through the hole L$^2$ into the passage O in the connecting rod H. In the intermediate position shown the flow can continue, but is now partly through the groove D$^4$ in the inside of the shell D. In the uppermost position the flow is about to be cut off as the end of the radial passage M$^1$ has reached those holes G$^2$ which open into the end of the groove D$^4$. As the crankshaft continues to rotate the flow of oil from the crank pin to the piston of the connecting rod H will cease until the crank pin is once more in the angular position in which it is shown in the lowermost view in Figure 4. The oil flowing through the hole O through the connecting rod H passes into a groove $O^1$ formed in the inner face of the little end $H^1$ whence the oil can be squirted through a hole $O^2$ on to the under side of the piston. The groove $O^1$ extends only part way round inside the little end, in the same way as the groove $N^2$ in the little end $A^1$, and the oil flows through this groove round the outer surface of the lining P of bearing metal.

With a construction such as described above it will be seen that there will be a flow of cooling liquid from the single crank pin M on the one hand through the connecting rod A to its piston and on the other hand through the connecting rod H to its piston only while the crank pin moves through certain determined arcs and that these arcs differ.

What I claim as my invention and desire to secure by Letters Patent is:

1. In apparatus for controlling the flow of liquid from a crankshaft towards the piston of an internal combustion engine, the combination of a hollow crank pin with a radial passage leading from its interior to an opening in the outer surface of the crank pin, a connecting rod having a passage therein running throughout its length with one open end of this passage in the crank pin end and the other open end within the opposite end of said connecting rod, a shell lying within said crank pin end having its inner surface a groove running circumferentially for a determined distance only and a hole through the shell which registers with the opening in said crank pin end of the passage through the connecting rod, so that liquid can flow from the said groove into the said passage, and a lining of bearing metal in the shell with a series of holes through this bearing metal positioned where they will register with the groove in the shell, cooling liquid being thus able to flow to the passage through the connecting rod from the interior of the crank pin upon rotation of the crank shaft only during such time as the end of the radial passage through the crank pin is passing along opposite to the groove in the said shell.

2. In apparatus for controlling the flow of liquid from a crankshaft towards the piston of an internal combustion engine, the combination of a hollow crank pin with a radial passage leading from its interior to an opening in the outer surface of the crank pin, a connecting rod having a forked crank pin end with a passage running throughout the length of the connecting rod from an opening in the fork of the crank pin end to an opening in the opposite end, a shell lying within said crank pin end and extending between the fork arms thereof, a groove running circumferentially for a determined distance only in the inner surface of the shell and a branch groove running laterally from this circumferential groove with a hole through the shell from the branch groove, the outer end of this hole registering with the open end in the said crank pin end fork arm of the passage through the connecting rod, so that cooling liquid can flow from the said grooves into the said passage, and a lining of bearing metal in the shell with a series of holes through this bearing metal positioned where they will register with the circumferential groove in the shell, cooling liquid being thus able to flow to the passage through the connecting rod from the interior of the crank pin upon rotation of the crank shaft only during such time as the end of the radial passage through the crank pin is passing along opposite to the groove in the said shell.

3. In apparatus for controlling the flow of liquid from a crankshaft towards the piston of an internal combustion engine, the combination of a hollow crank pin with a radial passage leading from its interior to an opening in the outer surface of the crank pin, a connecting rod having a forked crank pin end, a passage running throughout the length of the connecting rod from an opening in one fork of the crank pin end to an opening in the opposite end of the connecting rod, a shell lying within said crank pin end and extending between the fork arms thereof, a cap extending between the said fork arms and attached thereto, the inner surfaces of the shell and of the cap being circumferentially continuous, grooves running circumferentially in these inner surfaces of the shell and cap, these grooves lying in a plane normal to the crank pin axis and each extending only through a determined arc with an arc of smooth surface between the adjacent and spaced apart ends of separate grooves, a branch groove running laterally in the inner surface of the shell from one of the circumferential grooves therein with a hole through the shell from this branch groove, the outer end of this hole registering with the open end in the said crank pin end fork arm of the passage through the connecting rod, so that cooling liquid can flow from the one circumferential grove by way of the branch groove and the hole into the said passage, a second connecting rod whose said crank pin end and cap embrace the shell and cap of the first connecting rod with the cap of the second rod lying between the fork arms of the first rod, a passage running throughout the length of the second connecting rod from an opening in the big end thereof to an opening in the little end, a groove running circumferentially in the exterior surface of the cap of the first connecting rod with a hole through the cap through which cooling liquid can flow from one of the said circumferential grooves in the inner surfaces of that cap and the said shell, a lining of bearing metal in the cap and shell of the first connecting rod with a series of holes through this bearing metal positioned where they will register with the circumferential grooves within that cap and shell, and a lining of bearing metal between the big end and cap of the second connecting rod and the said parts embraced thereby, with a hole through this bearing metal which registers at one end with the groove in the exterior of the cap within it, and at the other end with the end of the passage through the second connecting rod.

FRANK BERNARD HALFORD.